(12) United States Patent
Takemura et al.

(10) Patent No.: US 10,627,228 B2
(45) Date of Patent: Apr. 21, 2020

(54) OBJECT DETECTION DEVICE

(71) Applicant: HITACHI AUTOMOTIVE SYSTEMS, LTD., Hitachinaka-shi, Ibaraki (JP)

(72) Inventors: Masayuki Takemura, Tokyo (JP); Takuma Osato, Tokyo (JP); Takeshi Shima, Tokyo (JP); Yuji Otsuka, Ibaraki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 258 days.

(21) Appl. No.: 15/540,304

(22) PCT Filed: Jan. 29, 2016

(86) PCT No.: PCT/JP2016/052567
§ 371 (c)(1),
(2) Date: Jun. 28, 2017

(87) PCT Pub. No.: WO2016/129403
PCT Pub. Date: Aug. 18, 2016

(65) Prior Publication Data
US 2018/0038689 A1 Feb. 8, 2018

(30) Foreign Application Priority Data

Feb. 12, 2015 (JP) .................... 2015-024881

(51) Int. Cl.
*G01C 3/08* (2006.01)
*G06T 7/00* (2017.01)
(Continued)

(52) U.S. Cl.
CPC .............. *G01C 3/085* (2013.01); *G01C 3/06* (2013.01); *G01C 3/14* (2013.01); *G01C 11/06* (2013.01);
(Continued)

(58) Field of Classification Search
None
See application file for complete search history.

(56) References Cited

U.S. PATENT DOCUMENTS 6,477,260 B1 * 11/2002 Shimomura ......... H04N 13/239
382/106
8,437,536 B2 * 5/2013 Saito ........................ G06T 7/593
382/154
(Continued)

FOREIGN PATENT DOCUMENTS

CN 104200483 A 12/2014
EP 0 874 331 A2 10/1998
(Continued)

OTHER PUBLICATIONS

Office Action dated Aug. 20, 2018 issued in the Japanese Patent Application No. 2015-024881 with its English machine translation.
(Continued)

*Primary Examiner* — Gandhi Thirugnanam
(74) *Attorney, Agent, or Firm* — Foley & Lardner LLP

(57) ABSTRACT

The purpose of the present invention is to provide an object detection device conducive to carrying out control in an appropriate manner according to the surrounding environment, with consideration to the accuracy of locations of detected objects. The device is characterized by being provided with: a parallax information generation unit for generating parallax information from a plurality of parallax images acquired from a plurality of imaging units; an object detection unit for detecting objects contained in the parallax images; a location information generation unit for generating location information about the objects, on the basis of the parallax information; and a location accuracy information generation unit for generating location accuracy information pertaining to the accuracy of the location informa-
(Continued)

tion, on the basis of the condition of generation of the parallax information.

13 Claims, 15 Drawing Sheets

(51) Int. Cl.

| | | |
|---|---|---|
| *G01C 3/06* | (2006.01) | |
| *G06T 1/00* | (2006.01) | |
| *G01C 3/14* | (2006.01) | |
| *G06K 9/00* | (2006.01) | |
| *G01C 11/30* | (2006.01) | |
| *G01C 11/06* | (2006.01) | |
| *G06K 9/03* | (2006.01) | |
| *G06K 9/46* | (2006.01) | |
| *G08G 1/16* | (2006.01) | |
| *G06T 7/11* | (2017.01) | |
| *G06T 7/70* | (2017.01) | |
| *G06K 9/62* | (2006.01) | |
| *H04N 13/204* | (2018.01) | |

(52) U.S. Cl.
CPC .......... *G01C 11/30* (2013.01); *G06K 9/00369* (2013.01); *G06K 9/00805* (2013.01); *G06K 9/036* (2013.01); *G06K 9/4642* (2013.01); *G06K 9/6215* (2013.01); *G06T 1/00* (2013.01); *G06T 7/00* (2013.01); *G06T 7/11* (2017.01); *G06T 7/70* (2017.01); *G08G 1/16* (2013.01); *G08G 1/166* (2013.01); *H04N 13/204* (2018.05); *G06T 2207/10028* (2013.01); *G06T 2207/20068* (2013.01); *G06T 2207/30261* (2013.01)

(56) References Cited

U.S. PATENT DOCUMENTS

| | | | | |
|---|---|---|---|---|
| 9,129,188 | B2* | 9/2015 | Hata | G06K 9/4652 |
| 9,393,961 | B1* | 7/2016 | Templeton | G06T 7/73 |
| 2003/0091228 | A1* | 5/2003 | Nagaoka | G06K 9/00651 |
| | | | | 382/154 |
| 2004/0096119 | A1* | 5/2004 | Williams | G06T 7/97 |
| | | | | 382/284 |
| 2004/0125207 | A1* | 7/2004 | Mittal | G06K 9/00771 |
| | | | | 348/169 |
| 2004/0234136 | A1* | 11/2004 | Zhu | G06K 9/3241 |
| | | | | 382/224 |
| 2008/0219505 | A1* | 9/2008 | Morimitsu | G06K 9/00201 |
| | | | | 382/103 |
| 2009/0153664 | A1* | 6/2009 | Higuchi | G06K 9/00805 |
| | | | | 348/148 |
| 2012/0224069 | A1* | 9/2012 | Aoki | G01B 11/026 |
| | | | | 348/187 |
| 2013/0250068 | A1* | 9/2013 | Aoki | G06T 7/85 |
| | | | | 348/47 |
| 2014/0368807 | A1* | 12/2014 | Rogan | G01S 17/50 |
| | | | | 356/28 |
| 2015/0015673 | A1* | 1/2015 | Matono | G01C 11/06 |
| | | | | 348/47 |
| 2015/0036886 | A1* | 2/2015 | Matono | G08G 1/166 |
| | | | | 382/106 |
| 2015/0145963 | A1* | 5/2015 | Oshima | G01B 11/00 |
| | | | | 348/47 |
| 2015/0278578 | A1* | 10/2015 | Otsuka | G08G 1/166 |
| | | | | 382/103 |
| 2016/0005234 | A1* | 1/2016 | Boivin | H04N 5/23229 |
| | | | | 345/419 |
| 2016/0162740 | A1* | 6/2016 | Takemura | G06K 9/00791 |
| | | | | 348/148 |
| 2017/0221188 | A1* | 8/2017 | Aoki | G01C 3/06 |
| 2018/0038689 | A1* | 2/2018 | Takemura | G01C 3/06 |

FOREIGN PATENT DOCUMENTS

| | | |
|---|---|---|
| EP | 2 602 761 A1 | 6/2013 |
| EP | 2 824 416 A1 | 1/2015 |
| JP | 2005-311691 A | 11/2005 |
| JP | 2007-249678 A | 9/2007 |
| JP | 2008-045974 A | 2/2008 |
| JP | 2008-065634 A | 3/2008 |
| JP | 2008-216177 A | 9/2008 |
| JP | 2012-144068 A | 8/2012 |
| JP | 2014-006745 A | 1/2014 |
| JP | 2014-096005 A | 5/2014 |
| JP | 2014-163830 A | 9/2014 |
| WO | WO-2008/102473 A1 | 8/2008 |
| WO | WO 2014/002692 A1 | 1/2014 |
| WO | WO 2014/073322 A1 | 5/2014 |
| WO | WO 2015-008566 A1 | 1/2015 |
| WO | WO-2015/008566 A1 | 1/2015 |

OTHER PUBLICATIONS

Sho Ikemura et al., "Real-Time Human Detection Using Relational Depth Similarity Features", Computer Vision-ACCV 2010, Jan. 1, 2011, Springer International Publishing, Heidelberg, XP05550526, ISSN: 0302-9743, vol. 6495, pp. 25-38.
Extended European Search Report dated Feb. 11, 2019 in the corresponding Application No. 16749047.3.
David Geronimo et al., "Survey of Pedestrian Detection for Advanced Driver Assistance Systems", IEEE Transactions on Pattern Analysis and Machine Intelligence, IEEE Computer Sociery, USA, vol. 30, No. 7, Jul. 1, 2010, pp. 1239-1258, XP011293817.
Nedevschi S et al., "Stereo-Based Pedestrian Detection for Collision-Avoidance Applications", IEEE Transactions on Intelligent Transportation Systems, IEEE, Piscataway, NJ, USA, vol. 10, No. 3, Sep. 1, 2009, pp. 380-391, XP011513051.
European Partial Supplementary European Search Report dated Sep. 25, 2018 in Application No. 16749047.3.
International Search Report dated May 17, 2016 as issued in corresponding International Application No. PCT/JP2016/052567 and its English translation thereof.
Examination Report issued in corresponding European Patent Application No. 16749047.3 dated Oct. 23, 2019.

* cited by examiner

FIG. 7

MPt-4　　MPt-3　　MPt-2　　MPt-1　　MPt　LOCATION ACCURACY INFORMATION OF INSTANTANEOUS VALUE

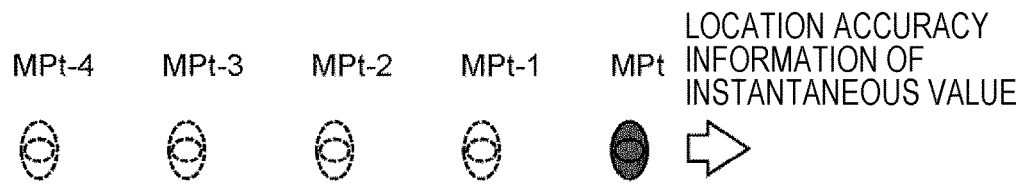

LOCATION ACCURACY OF INSTANTANEOUS VALUE IS ACQUIRED BY ACCURACY INFORMATION ACQUISITION UNIT 490, AND A VALUE OBTAINED BY FILTERING THE INFORMATION OF THE INSTANTANEOUS VALUE IS SET AS LOCATION ACCURACY INFORMATION.

LOCATION ACCURACY INFORMATION $Pt = ((1.0\text{-Weight}) \times Pt\text{-}1) + (\text{Weight} \times MPt)$ Weight: ADJUSTED IN THE RANGE OF NUMERICAL VALUES (0.0-1.0) BY WHICH THE DEGREE OF LOCATION ACCURACY OF INSTANTANEOUS VALUE OF CURRENT FRAME REFLECTED ON LOCATION ACCURACY INFORMATION WHICH IS TO BE USED FOR FINAL CONTROL IS DETERMINED

FIG. 8

LOCATION ACCURACY AFTER TTC SECOND IS CALCULATED FROM CURRENT LOCATION ACCURACY INFORMATION.
THE LENGTH OF TIME-TO-COLLISION VARIES, AND THEREFORE, THE LONGER THE PREDICTED TTC IS, THE MORE LIKELY IT IS THAT THE PREDICTED LOCATION OF PEDESTRIAN IS DEVIATED.
THEREFORE, COLLISION LOCATION ACCURACY INFORMATION AFTER TTC SECOND IS PREDICTED BY REDUCING ACCURACY OF CURRENT LOCATION OF PEDESTRIAN IN PROPORTION TO THE LENGTH OF TIME.

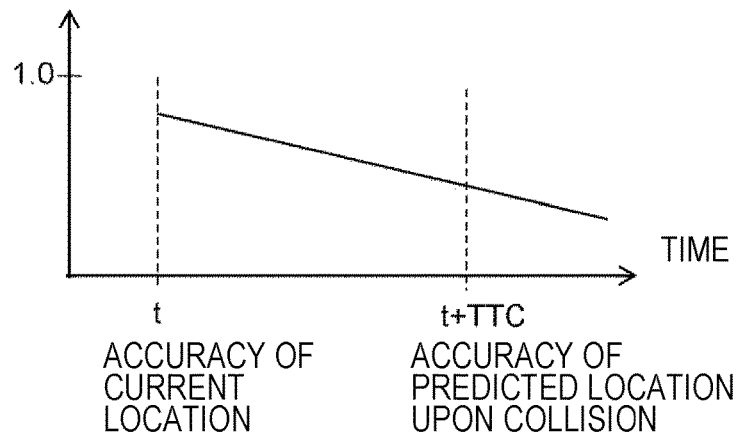

<LOCATION ACCURACY INFORMATION BASED ON DENSITY>
INEFFECTIVE PARALLAX: BLACK (FAILURE IN MATCHING)
EFFECTIVE PARALLAX: WHITE TO GRAY (SUCCESS IN MATCHING)

DENSITY = EFFECTIVE PARALLAX / FRAME AREA

FIG. 12

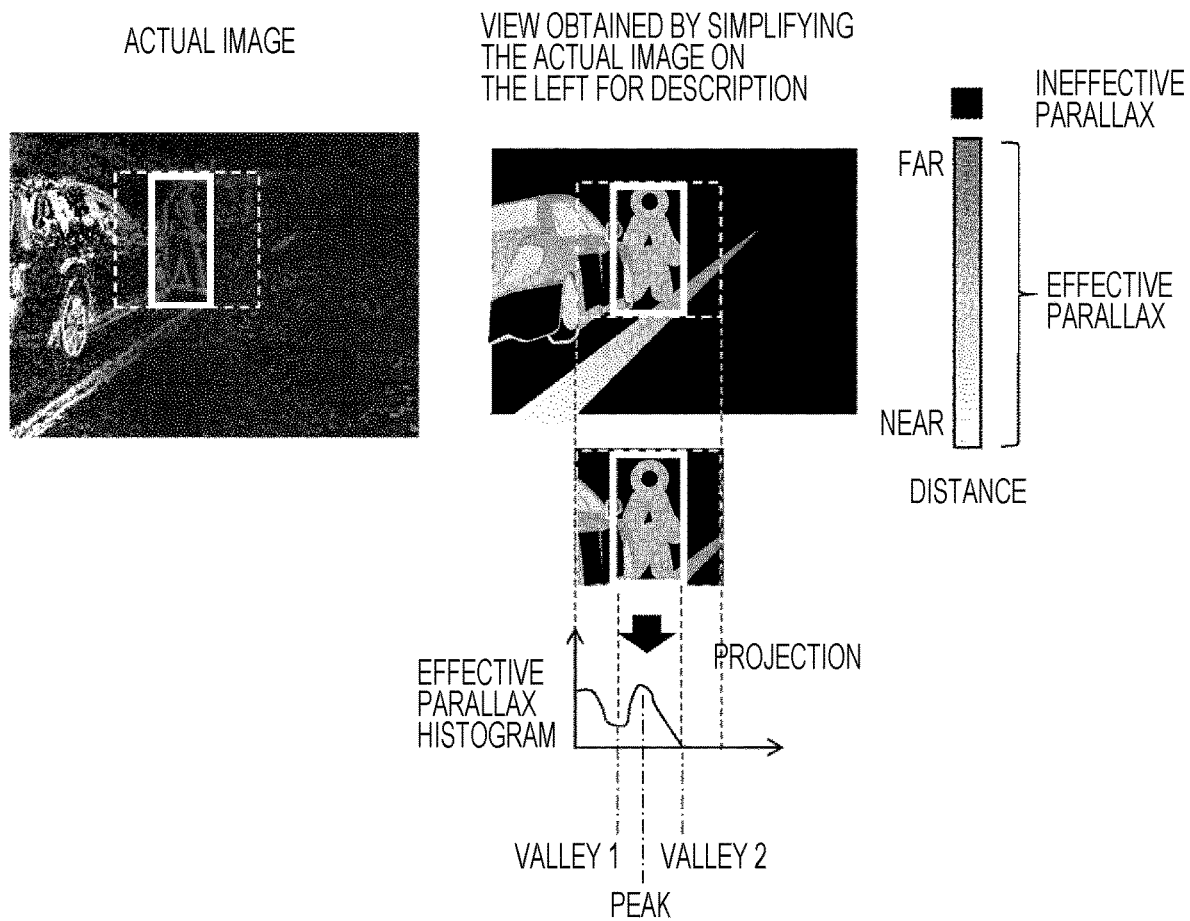

V1; TOTAL OF HISTOGRAM AT VALLEY 1 POSITION ±xdis
V2; TOTAL OF HISTOGRAM AT VALLEY 2 POSITION ±xdis
M ; TOTAL OF HISTOGRAM AT PEAK POSITION ±xdis

SEPARATION DEGREE = (V1+V2)/(2×M)

〈PERIPHERAL SEPARATION DEGREE〉
INDEX QUANTIFIED FOR DETERMINING WHETHER THERE IS A SINGLE 3D OBJECT.
DETERMINATION OF "WHETHER VOTES IN FRAME ARE LARGE, WHETHER THE VALUE
ON THE PERIPHERY IS LOW, WHETHER THERE IS 3D OBJECT ON THE PERIPHERY",
ETC. IS PERFORMED USING THIS INDEX.

FIG. 15
(a)
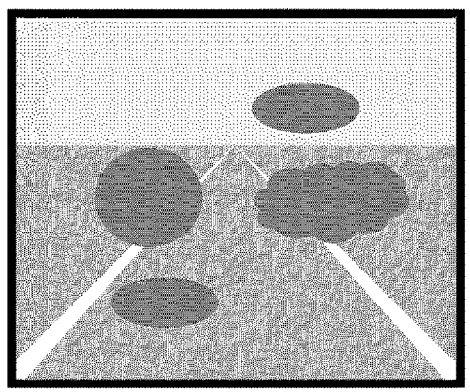
(b) A(x,y)
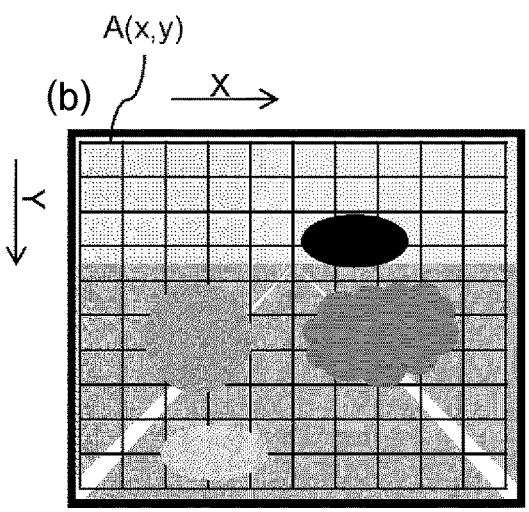
(c) SA(x,y)
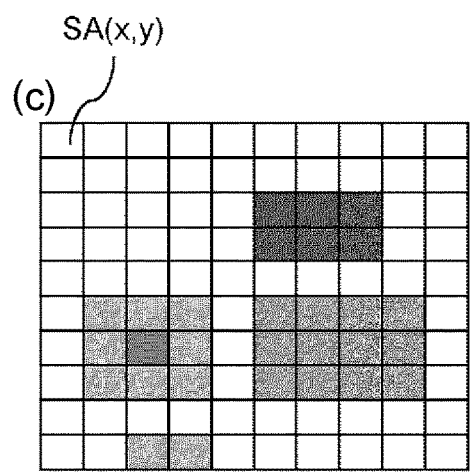
SCORE EXAMPLE
LOW ⇔ HIGH
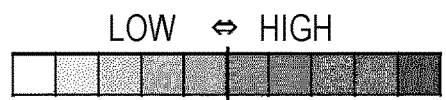
DETERMINED TO BE
A REGION WHERE
BACKGROUND IS
INVISIBLE DUE
TO ACCRETION

OBJECT DETECTION DEVICE

TECHNICAL FIELD

The present invention relates to an object detection device, and an on-vehicle surrounding environment detection device that detects 3D objects present around a vehicle using a stereo camera, determines likelihood of collision between the vehicle and the 3D objects on the basis of the behavior of the detected 3D objects and the vehicle, and outputs an alert or performs vehicle control.

BACKGROUND ART

The commercialization of an application for recognizing a vehicle surrounding environment by a camera mounted on a vehicle is on the increase. Among others, application to preventive safety technology for preventing accidents from occurring or to vehicle control technology aiming at autonomous traveling, by using the recognized object, has been expected. Recognition technology used for vehicle control naturally needs high reliability.

There has been PTL 1 as a technology in which, after a 3D object is detected, the reliability for the detected object is achieved. The device is an object detection device which detects a 3D object by using a distance image generated by a stereo camera, and evaluates the time-series stability or the contour shape of the detected object according to evaluation measures to calculate reliability.

CITATION LIST

Patent Literature

PTL 1: JP 2008-45974 A

SUMMARY OF INVENTION

Technical Problem

As described above, in the conventional technology, reliability in determining what an object is has been examined.

Meanwhile, reliability is also significant in addition to the determination of what an object is. For example, reliability or accuracy pertaining to the position of the detected object is also significant. The conventional technology described above does not handle accuracy pertaining to location information.

In view of this, the present invention aims to provide an object detection device conducive to carrying out control in an appropriate manner according to the surrounding environment, with consideration to the accuracy of locations of detected objects.

Solution to Problem

The present invention is characterized by being provided with: a parallax information generation unit for generating parallax information from a plurality of parallax images acquired from a plurality of imaging units; an object detection unit for detecting objects contained in the parallax images; a location information generation unit for generating location information about the objects, on the basis of the parallax information; and a location accuracy information generation unit for generating location accuracy information pertaining to the accuracy of the location information, on the basis of the condition of generation of the parallax information.

Alternatively, the present invention is characterized by being provided with: a parallax information generation unit for generating parallax information from a plurality of parallax images acquired from a plurality of imaging units; and an object detection unit that identifies and detects a plurality of objects overlapping in an optical axis direction of the imaging units, on the basis of a histogram for an amount of effective parallaxes projected on one axis, the effective parallaxes being parallaxes pertaining to objects to be imaged which are included in the parallax images and to which stereo matching has been performed.

Advantageous Effects of Invention

The present invention is conducive to carrying out control in an appropriate manner according to the surrounding environment, with consideration to the accuracy of locations of objects.

BRIEF DESCRIPTION OF DRAWINGS

FIG. 7 is a diagram illustrating a method for calculating current pedestrian location accuracy from location accuracy of an instantaneous value.

FIG. 8 is a diagram illustrating a method for calculating pedestrian location accuracy after TTC second.

FIG. 12 is a diagram illustrating an outline of a process in a peripheral separation degree calculation unit.

FIGS. 15(a) to 15(c) are diagrams illustrating a method for analyzing accretion.

DESCRIPTION OF EMBODIMENT

An embodiment of the present invention will be described below with reference to the drawings.

Figure 1:
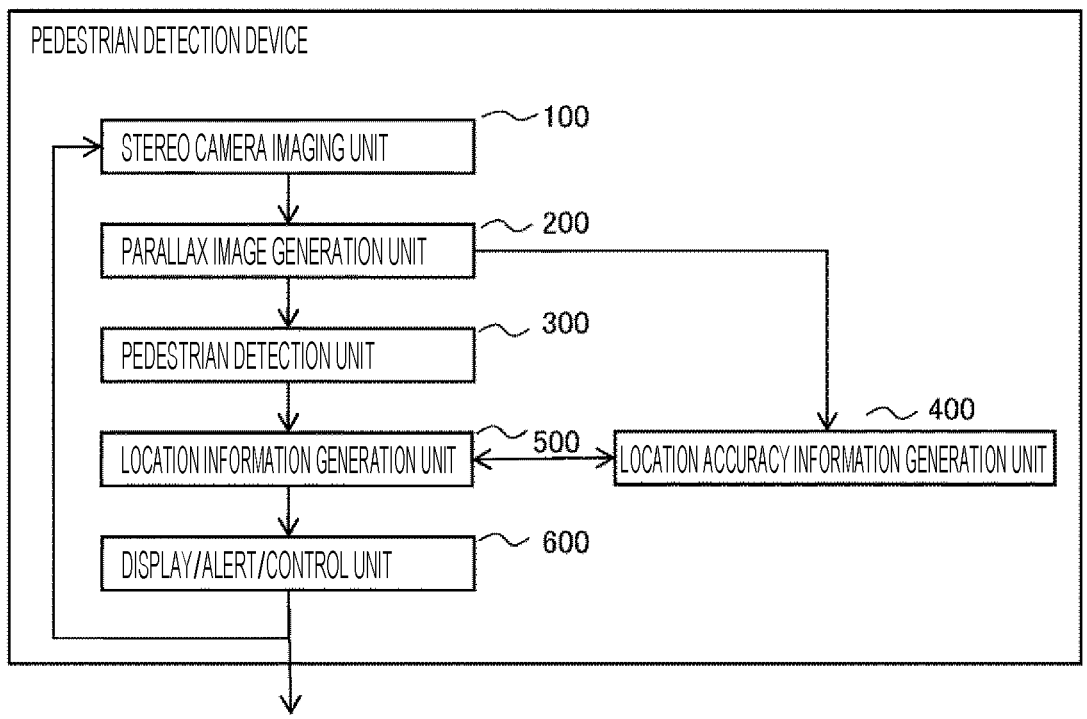
FIG. 1 is a block diagram of an object detection device according to an embodiment of the present invention.

FIG. 1 illustrates the configuration of a pedestrian detection device using a stereo camera. The pedestrian detection device includes a stereo camera imaging unit 100, a parallax image generation unit 200, a pedestrian detection unit 300, a location information generation unit 500, a location accuracy information generation unit 400, and a display/alert/control unit 600.

The stereo camera imaging unit 100 is provided with a stereo camera that captures an image of an environment ahead of a vehicle. The parallax image generation unit 200 generates parallax images by matching for each of small areas in left and right images captured by the stereo camera. The pedestrian detection unit 300 extracts 3D objects by using the parallax images, and tracks the extracted 3D object candidates in a time-series manner. When 3D object candidates are stably extracted in a time-series manner, the pedestrian detection unit 300 determines whether or not the parallax shape and the contour shape based on an edge extracted from a current image seem to be a pedestrian. The location information generation unit 500 generates the three-dimensional location of the detected pedestrian. The location accuracy information generation unit 400 generates location accuracy information, which indicates the accuracy of the location information, based on the result of the parallax images. The display/alert/control unit 600 executes display, alert, and control pertaining to preventive safety of the vehicle by utilizing the detection result, the location information, and the location accuracy information of the pedestrian.

Figure 2:
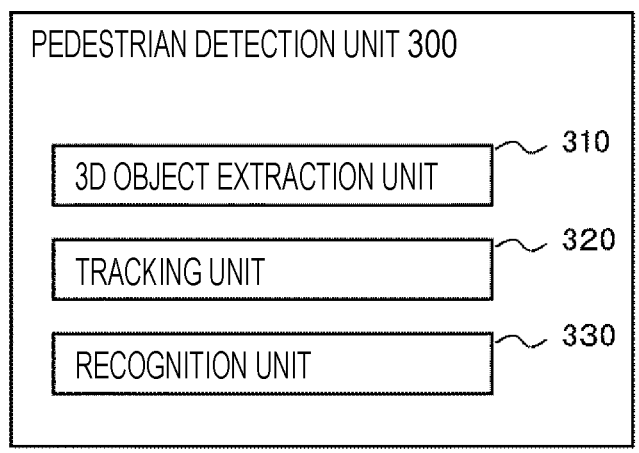
FIG. 2 is a block diagram of a pedestrian detection unit.

FIG. 2 illustrates the detailed configuration of the pedestrian detection unit 300. A 3D object extraction unit 310 extracts a block of parallaxes each being similar from the parallax images within a rectangular frame, thereby extracting a contour of a 3D object which seems to be one mass. Thus, an object from which parallaxes are continuously extracted in a stable manner can be extracted as a mass of a 3D object. In addition, it is determined whether or not an object, which is at a short distance from the extracted 3D object candidate and has similar parallax on the image, is to be combined. According to this process, 3D object candidates which have been extracted as objects divided from an object, having many ineffective parallaxes because of failure in matching due to insufficient texture, are combined together as one mass. On the contrary, it is again searched whether or not a pedestrian is included in the extracted 3D object candidates, and 3D object candidates including pedestrians, vehicles, motorbikes, etc. are extracted by the 3D object extraction unit 310.

Next, the 3D object extracted by the 3D object extraction unit 310 is tracked by a tracking unit 320 in a time-series manner. The 3D object is tracked in such a manner that the location of the 3D object, the size of the 3D object, and the predicted parallax value of the 3D object on an image of the current frame predicted from the previous frame in consideration of the behavior of the vehicle are compared to similar locations, sizes, and parallax values within a certain threshold, and the similarity is compared between the location on the image of the previous frame and the location on the image of the current frame.

If a 3D object is once recognized, high-precise tracking using prediction information indicating that the target object is a vehicle moving at certain kilometers per hour, for example, is enabled. However, at the beginning of the initial tracking, the movement of the target object is unclear, so that rough tracking is executed for a 3D object to determine whether or not the 3D object is such an object which is stably extracted in a time-series manner.

Next, a recognition unit 330 performs pedestrian determination for an object with a pedestrian size in the 3D objects described above, thereby determining whether or not the object is a pedestrian. At first, the recognition unit 330 briefly determines whether or not there is an object, in 3D object candidates, having a pedestrian-like size, on the image, according to a horizontal to vertical ratio and the depth distance obtained through conversion from the parallax into the distance. The recognition unit 330 does not perform the recognition for a 3D object with a size clearly different from the size as a pedestrian candidate, in consideration of the processing load.

Next, the recognition unit 330 determines whether or not the depth shape of the 3D object with a pedestrian-like size in the parallax image seems to be a pedestrian. For this process, a pattern matching method or a template matching method is used. In addition, it is roughly determined whether or not the pedestrian shape determined by using contour information in the original image seems to be a pedestrian, and a 3D object clearly different from a pedestrian is determined not to be a candidate for the recognition. This is because, since a recognizer for recognizing a pedestrian has a high processing load, the narrowing of candidates to some extent is previously carried out to reduce the processing load as a whole for pedestrian recognition. The pedestrian determination using the pedestrian recognizer is executed only for the pedestrian candidates which have been narrowed down by the pedestrian determination performed in advance. The recognizer performs the pedestrian recognition on the basis of the distribution condition of edge angles in a frame obtained by dividing the frame of the extracted 3D object candidate in a lattice, and thus, it is finally determined whether or not the extracted 3D object candidate is a pedestrian.

Figure 3:
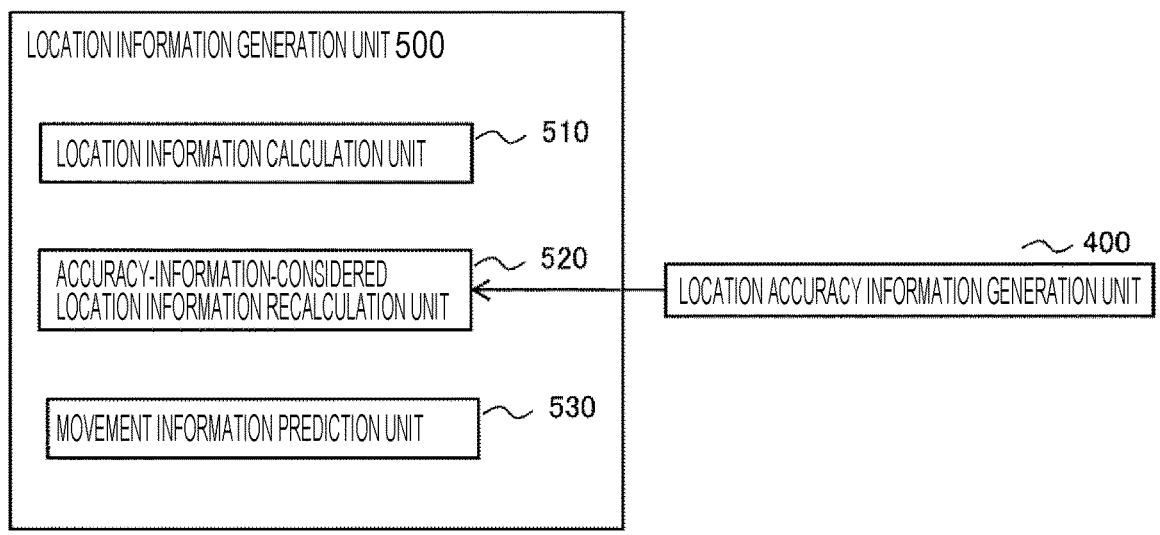
FIG. 3 is a block diagram of a location information generation unit.

Next, FIG. 3 illustrates the location information generation unit 500 for a pedestrian. A location information calculation unit 510 calculates, for a detected pedestrian, an average value of location information utilizing an average value of parallax images of the pedestrian in a frame. An average value of parallax images excluding parallaxes largely different from the parallax at a short distance and parallax of a distant view may be calculated so that background parallax information is not included.

Next, recalculation of location information considering accuracy information is performed in an accuracy-information-considered location information recalculation unit 520. Although the detail will be described in the description of a process for generating location accuracy information, a region of a noise factor for the pedestrian is determined by the location accuracy information generation unit 400. In the rectangular frame used for the pedestrian detection, a region which seems to be a pedestrian and a region which includes other 3D objects and is likely to be an error factor are distinguished. The information of the region which seems to be a pedestrian in the detection frame is acquired from the location accuracy information generation unit 400, and the accuracy-information-considered location information recalculation unit 520 searches parallax information by concentrating on the region which seems to be a pedestrian to again acquire the location information. Thus, a pedestrian location having higher accuracy is extracted.

Next, the acquired pedestrian location is analyzed in a time-series manner, and the destination of the pedestrian is predicted by a movement information prediction unit 530. This will be described with reference to an upper chart in FIG. 17. If the pedestrian location can be acquired two frames before the current frame, it is supposed that the pedestrian location from T-2[frame] to the current T[frame] can be acquired. In this case, the direction of movement of the pedestrian can be predicted by utilizing the pedestrian location information from T-2 to T[frame]. An upper right broken arrow in FIG. 17 indicates the predicted movement of the pedestrian predicted from the pedestrian location.

Figure 17:
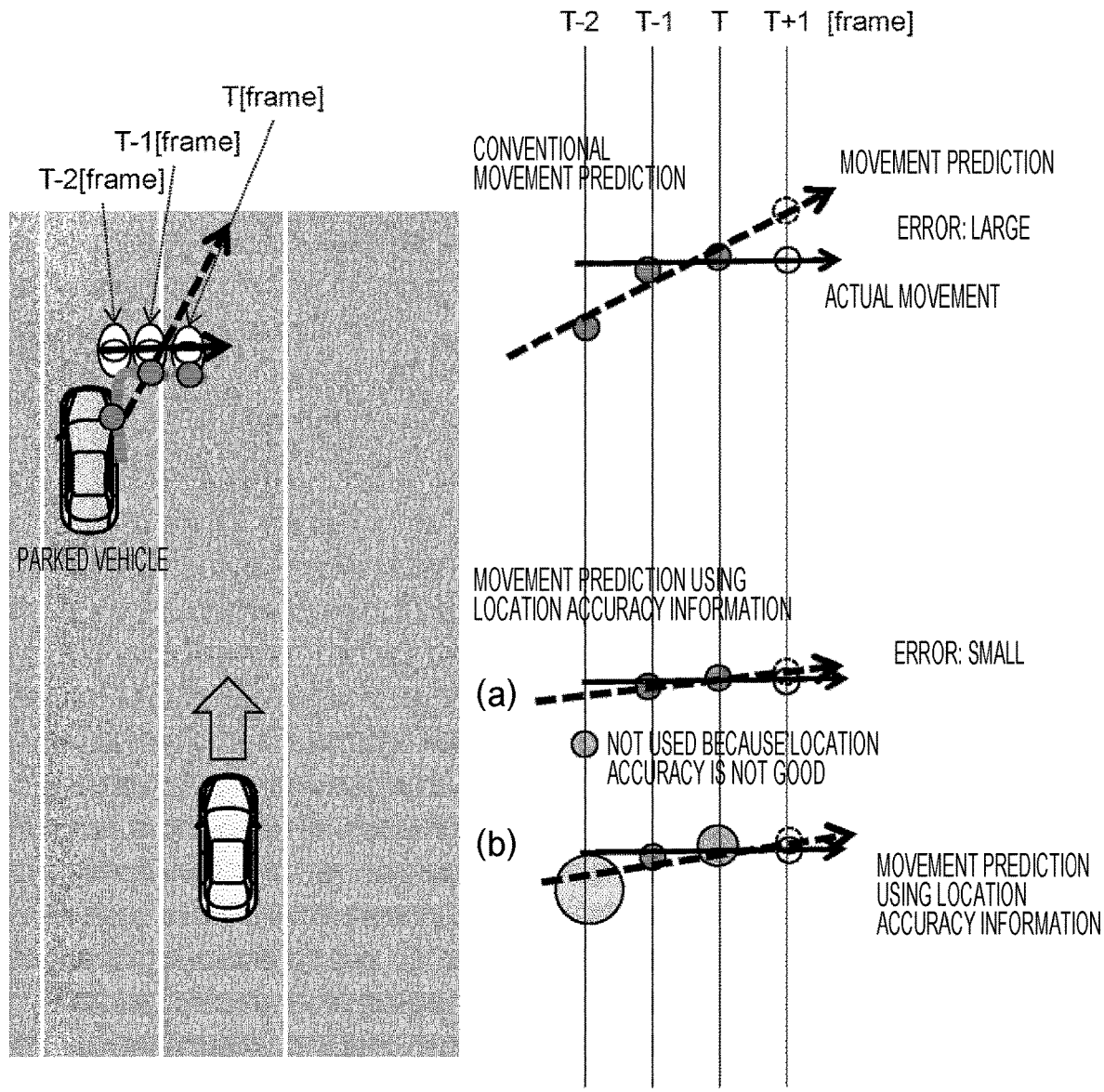
FIG. 17 is a diagram illustrating a method for predicting the movement of a pedestrian.

However, in actuality, if the movement direction is predicted in the manner described above, i.e., if the movement prediction is performed by using information, as it is, in which an error is caused on the pedestrian location because a part of the vehicle is in the pedestrian detection frame in T-2[frame], there may be the case in which wrong prediction is performed such that the pedestrian moves in the upper right direction indicated by the upper right broken arrow in FIG. 17, although the pedestrian actually moves just sideway as indicated by a solid right arrow in FIG. 17.

In view of this, the movement prediction is performed by using an instantaneous value of the location accuracy information acquired by the location accuracy information generation unit 400. As illustrated in movement prediction (a) using the location accuracy information in the lower-right part in FIG. 17, the location with low accuracy as a result of using the location accuracy information is not used as the data for performing the movement prediction. As described above, it is determined whether or not a location is used as the data for the movement prediction according to location accuracy information. Thus, data having low location accuracy which is likely to have a large error is determined not to be used as the data for the movement prediction, whereby the location data having a large error is not used for the movement prediction as illustrated in (a), and therefore, the actual movement and the predicted movement can be obtained with less error.

In addition, instead of the method for determining whether or not a certain location is used according to a level of location accuracy, such a method may be used in which, when accuracy is low, prediction in consideration of low accuracy is conducted.

As illustrated in lower-left FIG. 17(b), when accuracy is predicted to be high due to high location accuracy information, a high value is voted to one point, and when accuracy is predicted to be low due to low location accuracy information, low values are voted on the periphery, not on one point. According to this, a voting result in which a voting range is increased according to the magnitude of an error is obtained as illustrated in FIG. 17(b). In the movement prediction, a line connecting these points is searched, and a line having the highest votes thereon is searched. According to this process, the movement prediction in which an error in a location is considered based on the accuracy information is performed, whereby movement prediction with less error can be implemented.

By utilizing the location accuracy information as described above, even in the case in which the accuracy of the location itself cannot be improved, the calculation for the movement prediction is performed by giving priority to the information having high location accuracy in time-series information, whereby the accuracy in the movement prediction can be enhanced.

According to the effect of the present embodiment, not only for the location accuracy of a pedestrian who is rushing out but also for the location accuracy of a pedestrian who is crossing or a pedestrian who is walking on a walking path, the magnitude of an error applied to a location by 3D objects or background around the pedestrian can be represented by the location accuracy information, whereby movement prediction or the like can more accurately be calculated. In addition, if the location accuracy information is extremely low, there may be a method in which the instantaneous location information thereof is not used, because this information cannot be used for control, although a pedestrian can be detected by this information. Thus, the movement prediction from which an influence due to an error is reduced can be implemented.

In addition, the movement information prediction unit 530 not only predicts movement information but also filters time-series instantaneous value location accuracy information and sets this information as current location accuracy information. The current location accuracy information indicates what location accuracy information is used in a time-series manner to obtain the result of action prediction. As illustrated in the calculation equation in FIG. 7, the current location accuracy information is calculated through filtering by using the location accuracy information of an instantaneous value. When the location accuracy information generation unit outputs the location as a result of the correction of the location accuracy itself, the location accuracy information for the corrected result is outputted as the location accuracy information of an instantaneous value.

Figure 4:
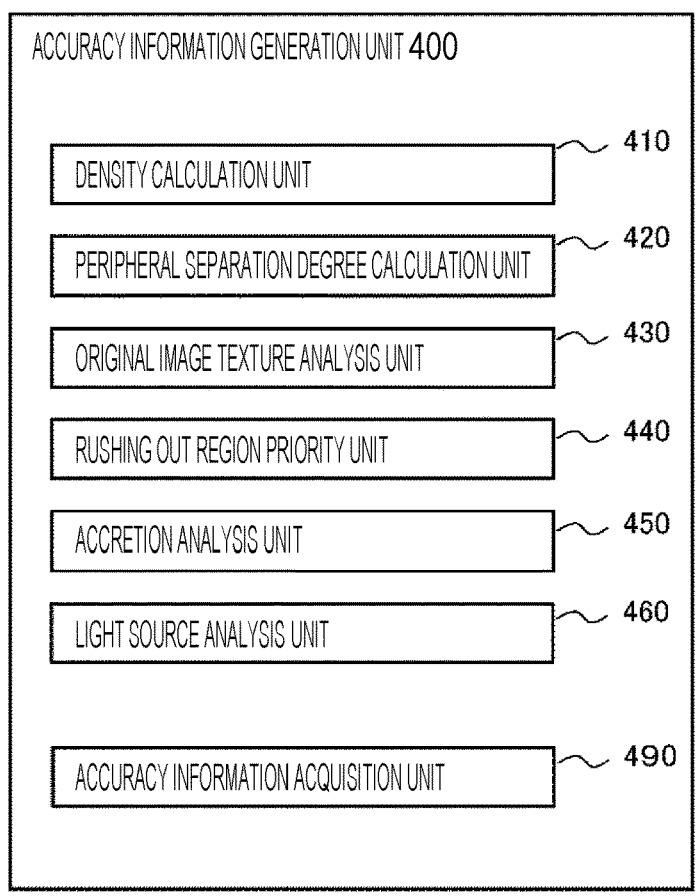
FIG. 4 is a block diagram of an accuracy information generation unit.

Next, the outline and the components of the location accuracy information generation unit 400 will briefly be described with reference to FIG. 4. As illustrated in FIG. 4, the location accuracy information generation unit 400 acquires information pertaining to location accuracy from various information items, finally acquires information pertaining to the location accuracy of a pedestrian candidate location by an accuracy information acquisition unit 490, and delivers the acquired information to a pedestrian detection unit 300. In the configuration of delivering only location accuracy information, the similar effect can be obtained by directly delivering the information to the display/alert/control unit.

Herein, it is to be noted that, since the location information generation unit 500 is supposed to recalculate the location information by an accuracy-information-considered location information recalculation unit 520 on the basis of the information acquired by the location accuracy information generation unit 400, the information pertaining to the pedestrian location, including the accuracy information, is delivered to the location information generation unit 500. The detail of the process in the location accuracy information generation unit 400 will be described later.

Figure 5:
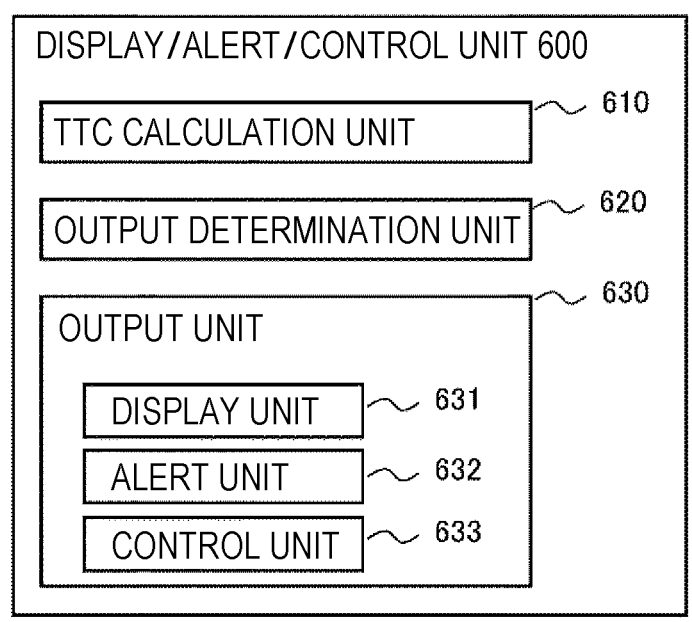
FIG. 5 is a block diagram of a display/alert/control unit.
Figure 6:
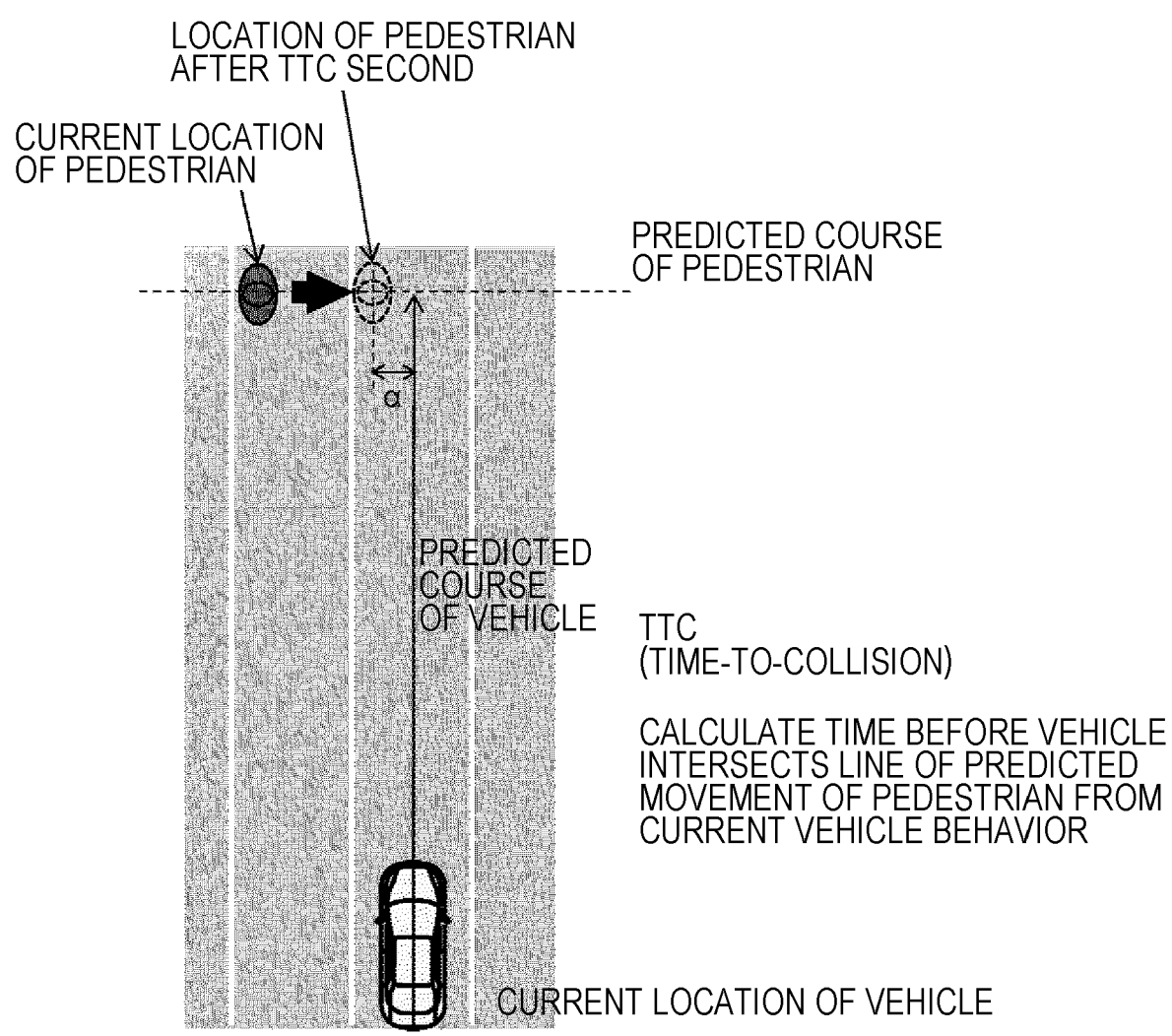
FIG. 6 is a diagram illustrating a method for determining likelihood of collision against a pedestrian.

Finally, the display/alert/control unit 600 will be described with reference to FIG. 5. As illustrated in FIG. 6, a TTC calculation unit 610 calculates a traveling course of the vehicle by using the speed of the vehicle and the yaw rate. Then, based on the movement prediction information of the pedestrian which has been detected and traveling course prediction information of the vehicle, an intersection point where two action prediction paths intersect each other is extracted, and a TTC taken for the vehicle to move to this point is calculated. In this case, time is calculated as TTC, regardless of whether or not the vehicle will collide with the pedestrian. As for a pedestrian who is stopped without moving, the location of the pedestrian is considered to be a point, and only when the distance between a line of a traveling course of the vehicle and the location where the pedestrian is stopped falls within a certain distance, the TTC (time-to-collision) is calculated. As described above, the TTC calculation unit 610 calculates TTC in the case in which it is supposed that the vehicle collides with the detected pedestrian. Notably, a pedestrian or the like with which the vehicle will not obviously collide based on the direction of movement is outside the target for control and alert, so that the calculation therefor may not be performed.

Next, the place where the pedestrian is supposed to be present after the calculated TTC seconds is calculated to determine collision likelihood. FIG. 6 shows one example of the calculation. This is such a case in which a pedestrian crosses the traveling course of the vehicle, the pedestrian and the vehicle both moving straight. Since the time TTC before the vehicle reaches the depth where the pedestrian is present has been obtained, the pedestrian location after the TTC seconds is estimated. Thus, the collision likelihood is determined on the basis of the pedestrian location, in consideration of the location of the center of the vehicle and an offset width α of the pedestrian after the TTC seconds. Such cases may be considered in which the pedestrian has already crossed the lane on which the vehicle travels or the vehicle goes through before the pedestrian crosses because the movement speed of the pedestrian is low. Therefore, the location of the pedestrian and speed information are significant for the collision likelihood.

The collision likelihood for a pedestrian who is not moving is similarly determined here. To perform determination of whether it is used for the vehicle control, the collision likelihood of the pedestrian present within the offset width α from the predicted course of the vehicle is determined.

Then, as for the vehicle which is determined to have collision likelihood by the TTC calculation unit which determines the collision likelihood, location accuracy information after the TTC seconds is calculated, and the output content according to the accuracy is determined by an output determination unit 620. When the accuracy is high, the control to avoid collision is more positively executed, and when the accuracy is low on the contrary, the control is changed to low vehicle control or changed only to issue an alarm. This is because, if vehicle control is performed by mistake, for example, sudden braking is applied even though the vehicle is not on a collision course, the vehicle is at a risk of being hit by a vehicle traveling behind the vehicle.

The calculation process is performed in which the accuracy of the pedestrian location after the TTC seconds is reduced in proportion to the length of the time-to-collision TTC from the current location accuracy information as illustrated in FIG. 8. This is because, the longer the length of the TTC is, the more likely it is that the predicted location is wrong, i.e., the more likely it is that the direction of movement of the pedestrian is changed or that the movement speed is changed. Therefore, the collision location accuracy information after the TTC seconds is predicted by reducing the accuracy of the current pedestrian location in proportion to the length of the time.

However, the vehicle control is not performed under the condition in which, if a driver applies brakes just after the moment a pedestrian is present on the collision course, the collision can completely be avoided. The vehicle control is not performed for a target object for which the collision is clearly avoided by applying brakes by the driver. Otherwise, sudden braking is applied in a scene unexpected by the driver, and in the worst case, it can be considered that the vehicle is hit by a following vehicle. Even if the vehicle is not hit by the following vehicle, when controls considered to be unnecessary by the driver are frequently performed, such controls are unnecessary for the driver. Sudden braking is applied only when the collision is difficult to be avoided unless the brake control is performed at this timing. In actuality, the time-to-collision or the location accuracy information upon collision can also be calculated. However, in the present circumstances, supposing that the driver applies brakes in advance, it is determined that there is no collision likelihood, and the location accuracy information is determined to be zero which is the lowest.

Next, the output determination unit 620 determines the output content on the basis of the collision location accuracy information calculated by the TTC calculation unit 610 and the offset width α from the predicted course of the vehicle.

Figure 9:
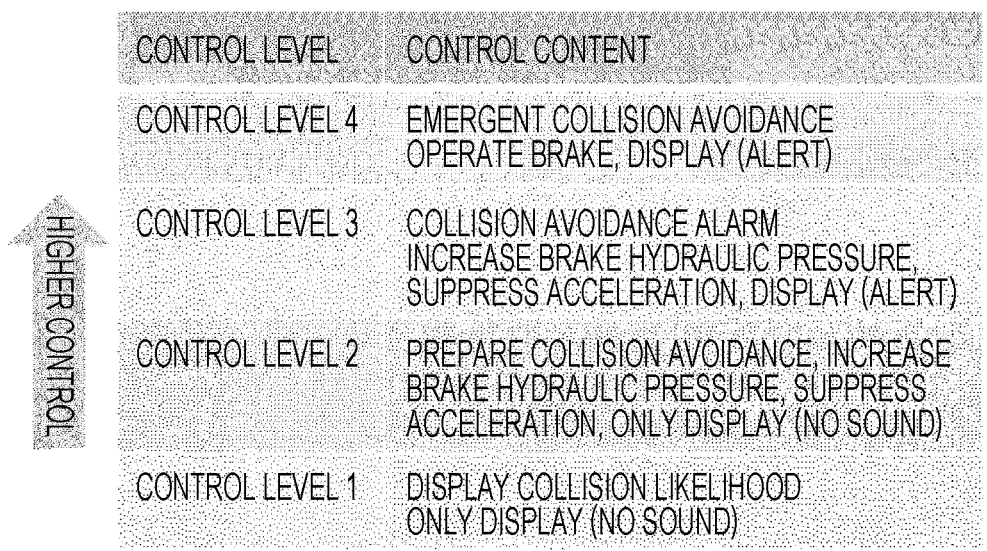
FIG. 9 is a diagram illustrating a control level table.

FIG. 9 illustrates control levels of the vehicle. The control level is changed according to the offset width or the location accuracy indicating the location of the pedestrian at the time at which the collision is predicted to occur. It is considered that, the higher the accuracy is and the smaller the offset width is, the higher the collision likelihood is, and therefore, the control level is increased to a higher level. As illustrated in FIG. 9, in a control level 1, so-called control is not performed, and the presence of a pedestrian near the vehicle is only displayed on a display with no sound. Only the display is provided so that the driving operation by the user is interrupted if the detected location or predicted location of a pedestrian is wrong.

Next, in a control level 2, considering that there is collision likelihood, but such possibilities are presumed in which the predicted location of the pedestrian is deviated, the vehicle passes near the pedestrian, etc., the acceleration of the vehicle is suppressed, and emergency braking is prepared. However, the control content for interrupting the normal driving operation by the driver is not provided. In a control level 3, emergency braking is not applied, but the collision likelihood is determined to be extremely high, so that the presence of the pedestrian is notified to a user with an alarm, and preliminary preparation for collision avoidance is executed. The brake hydraulic pressure is increased to increase the response speed when the user operates the brake, and the hydraulic pressure is increased and acceleration is suppressed, to more quickly activate the emergency brake when the location accuracy of the pedestrian is improved. Finally, in a control level 4, it is considered that the vehicle will definitely collide with the pedestrian, and therefore, braking is applied to bring the vehicle to an emergency stop, and notifies the driver of the presence of the pedestrian by issuing a sound.

Figure 10:
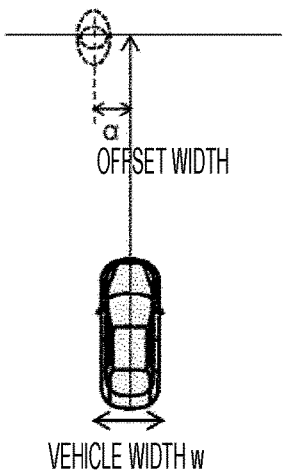
FIG. 10 is a diagram illustrating a control table based on predicted location accuracy and an offset width.

The output determination unit 620 determines the control level on the basis of the predicted location accuracy and the offset width of the pedestrian illustrated in FIG. 10. As the offset width, which is the difference between the predicted course of the vehicle and the predicted location of the pedestrian, is increased, the collision likelihood between the pedestrian and the vehicle is reduced, so that the control level is lowered. In addition, the same is applied to the predicted location accuracy. Even if the collision with the vehicle is definite based on the predicted location of the pedestrian, it is considered that an error is caused on the pedestrian location itself, and an output content in the lowered control level is determined.

An output unit 630 indicates an operation content respectively to a display unit 631, an alert unit 632, and a control unit 633, by utilizing the determination result. The display unit 631 provides a display, or displays the presence of a pedestrian on a vehicle meter panel section. The location relation between the pedestrian and the vehicle may be displayed on the display in a simplified manner. The alert unit 632 issues a sound notifying that the collision likelihood with the pedestrian is high on the basis of the indication from the output unit. The control unit 633 transmits a command to stop the vehicle to actually apply the brake.

Next, the detail of the location accuracy information generation unit 400 will be described with reference to FIG. 4.

<Density Calculation Unit 410>

Figure 11:
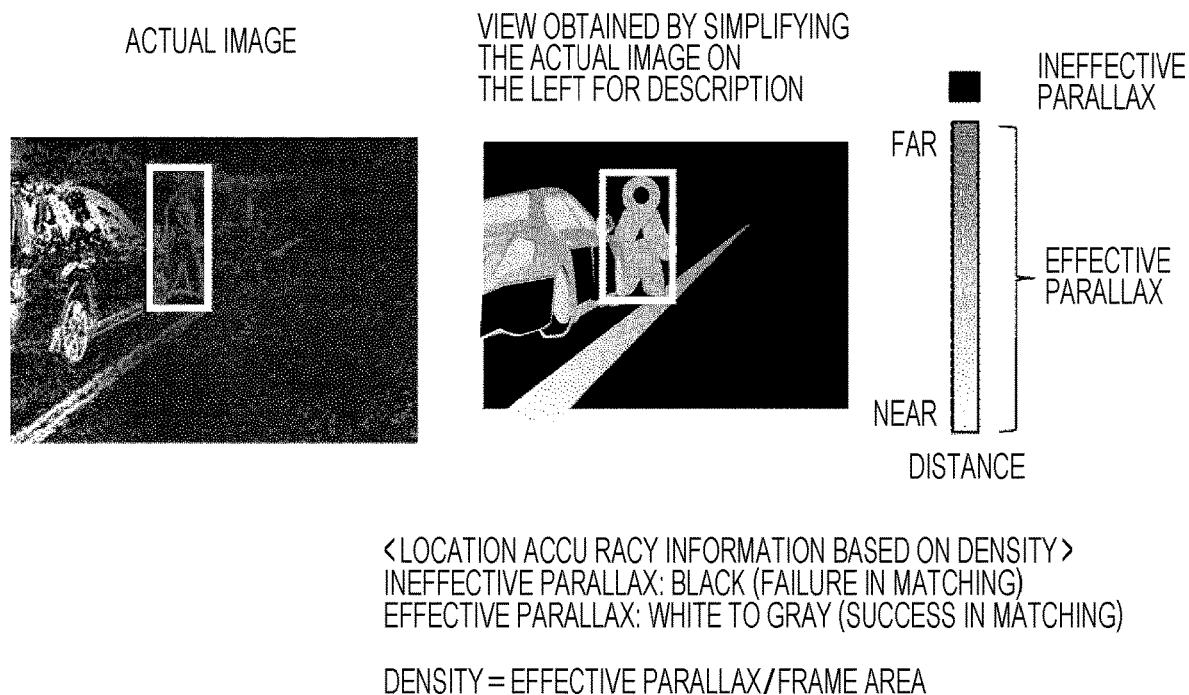
FIG. 11 is a diagram illustrating an outline of a process in a density calculation unit.

As illustrated in FIG. 11, the density calculation unit 410 calculates the density of effective parallaxes in the frame of the image of the pedestrian candidate extracted by the pedestrian detection unit. Herein, the effective parallax means a parallax pertaining to the part of the object to which stereo matching has been performed. Further, the stereo matching indicates that the same objects to be imaged or corresponding parts or common parts of the object, included in a plurality of parallax images, are associated with one another through comparison of parallax images. According to this process, effective parallaxes which are parallaxes pertaining to the objects to be imaged or corresponding parts or common parts of the object, included in the parallax images, are obtained.

Matching of images in small areas including pedestrian candidates in left and right stereo images is performed. When the same object having an image characteristic amount is present in the areas, the matching is successful because the same object is viewed on the locations deviated from each other by the parallax in the left and right images and therefore, the image characteristics are similar. In this case, the value in the small area in which matching is successful is specified as an effective parallax, and the value in the small area for which a matching place is not found even by searching on the images captured by the left and right cameras and therefore, matching is in failure, is specified as an ineffective parallax.

The following equation in which the number of effective parallaxes in the frame are divided by the area of the frame is specified as an effective parallax density. It is considered that, the higher the density is, the larger the number of effective parallaxes in the frame is, so that the pedestrian location is reliable.

Effective parallax density=number of effective parallaxes in frame/frame area

In addition, it may be configured such that, from among the effective parallaxes in the frame in the above equation, only the parallax values existing near the pedestrian location extracted in a simplified manner are concentrated, and the effective parallax density is calculated on the basis of the values excluding the parallax of the background region which is in the frame and has an effective parallax. Meanwhile, in this case, it is not so difficult to count the parallax of the background with a clearly different parallax value as being discounted. However, it is difficult to exclude a 3D object which is in the frame and at a short distance from the pedestrian, because of close parallax values.

<Peripheral Separation Degree Calculation Unit 420>

FIG. 12 illustrates the outline of the calculation of a peripheral separation degree. In extracting the location accuracy of a pedestrian, if other object is included in the frame from which the pedestrian is extracted, it is highly likely that an error is caused on the pedestrian location due to an influence of the parallax value of the other 3D object. In view of this, it is checked whether or not there is another 3D object present around the pedestrian. With this, it is checked whether or not parallax values other than that of the pedestrian become an error factor in extracting the pedestrian location.

As illustrated in FIG. 12, the detected pedestrian frame is enlarged horizontally, and all effective parallaxes in the region are projected in the vertical direction of the image. In this case, in addition to the narrowing to effective parallaxes, a pixel having a parallax value largely distant from the pedestrian location which has been roughly calculated may be specified as background, and may be discounted. As described above, the separation degree from peripheral objects is calculated by using an effective parallax histogram projected in the vertical direction of the image.

A histogram total M within a range of ±xdis on the peak of the histogram in the pedestrian frame is calculated. Then, positions of valleys which are low and located on the left and right of the peak of the histogram are searched. A histogram total V1 within a range of ±xdis on the left valley and a histogram total V2 within a range of ±xdis on the right valley are calculated.

M on the peak and V1 and V2 on the left and right valleys in FIG. 12 are compared. As the valleys are lower with respect to the peak, it is considered that the separation degree from the periphery is high. As the separation degree is high, it is considered that the possibility of the influence of parallax information of other object, which is an error factor, on the pedestrian location is low.

The specific equation for calculating the separation degree is as follows.

$$\text{Separation degree}=(V1+V2)/(2\times M)$$

FIGS. 13(A) to 13(C) illustrate an example in which the separation degree is high and an example in which the separation degree is low, in actuality. FIGS. 13(A) to 13(C) illustrate one example indicating that, when the method is used in which an average of parallaxes in the frame is determined to be a pedestrian location, an error is caused because an object having a different parallax is included in the detection frame of the pedestrian.

Figure 13:
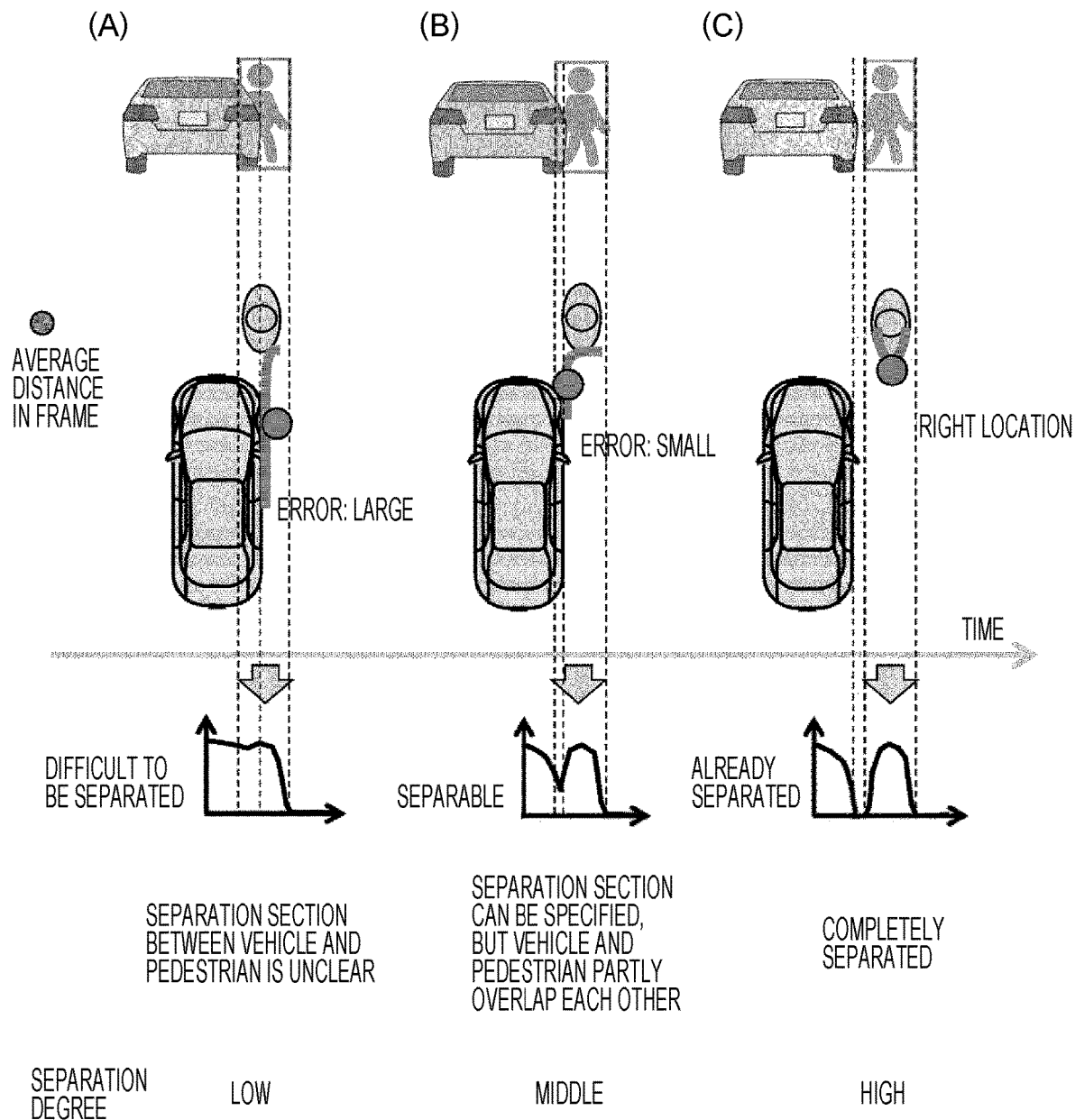
FIGS. 13(A) to 13(C) are explanatory views of a scene in which an error is likely to be caused on a pedestrian location.

In a scene (A) on the left in FIG. 13, about a half of the body of a pedestrian who is about to rush out from a vehicle can be seen, so that pedestrian recognition could be enabled on the basis of the shape as the pedestrian. Therefore, when pedestrian detection is immediately performed with only the parallax in the frame being used, the parallax for the vehicle side, or the parallax for the vehicle side including a part of the vehicle rear when seen from different angles, is regarded as the parallax for the pedestrian by mistake, and with this state, the pedestrian location is calculated as illustrated in the left view on the middle in FIG. 13. Therefore, a large error is caused on the parallax and depth obtained by averaging. When the separation degree is calculated under this condition, a histogram for parallaxes indicating that little gap is present between the pedestrian and the vehicle is obtained as illustrated in the lower-left part in FIG. 13, and so, the separation degree is low. When the separation degree is low, the accuracy information acquisition unit 490 considers that there is a high possibility of the location accuracy being low, in consideration of the condition that false parallax is prone to be included.

A scene (B) is intermediate between a scene (C) and the scene (A), wherein the separation degree is also intermediate. The scene (C) will be described. In the scene (C), the pedestrian is away from the vehicle body, so that the position of the peak and the positions of the valleys are clearly recognized in the histogram. Therefore, it is clearly understood that there is no 3D object around the pedestrian, and it is determined that the separation degree in this case is high and the pedestrian location accuracy is also high.

Further, a method for improving the location accuracy of the pedestrian using the separation degree will also be described. Firstly, in the state in which the separation from the periphery is clear as illustrated in FIG. 13(C), it is difficult to consider that the error factor of the parallax information of an object other than the pedestrian is caused.

Therefore, it is construed that the pedestrian location is calculated with high accuracy and the location correction is unnecessary.

However, in the case of the scene (B), it is found that there is a portion where the vehicle and the pedestrian overlap each other in the frame in which the pedestrian is detected. Therefore, the pedestrian and the vehicle are separated from each other using the valley position to calculate the accuracy of the pedestrian location.

Figure 14:
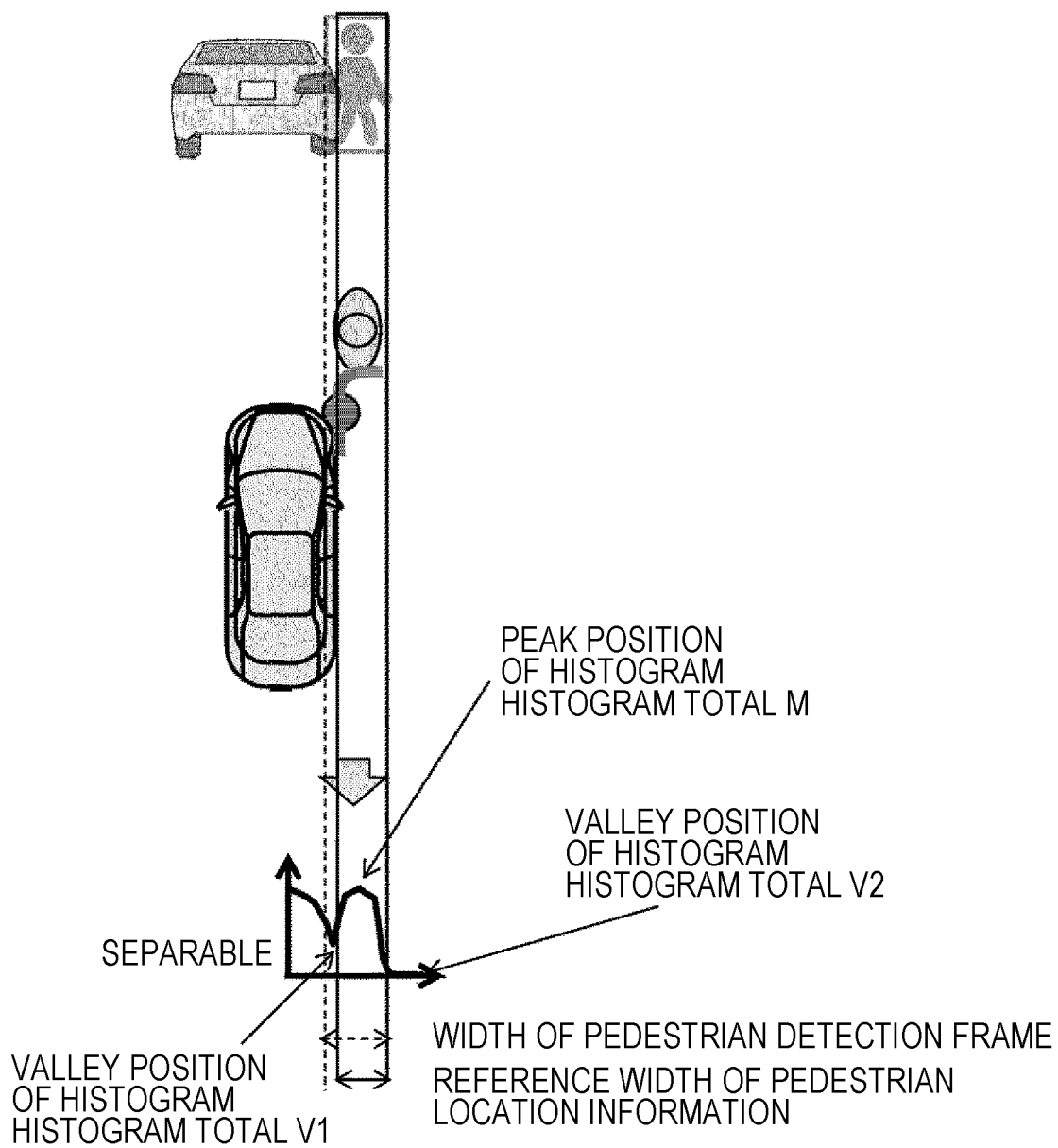
FIG. 14 is an explanatory view for increasing location accuracy by utilizing a projection histogram.

Actually, it is considered that, when V1/M or V2/M is not less than a certain threshold, a detection frame including both the periphery and an object is likely to be formed. FIG. 14 illustrates the outline in actually performing correction. It is considered that the right side from the valley position on the center position of V1 does not need the correction for separation, because V1/M is not less than the threshold, V2 is originally outside the frame, and V2/M is obviously not more than the threshold. Therefore, distance information is generated by using a parallax image in a region between the left end of the frame being the valley position of V1 and the right end which is the original right end of the pedestrian detection frame, in order to improve the accuracy of the location information.

<Original Texture Analysis Unit 430>

Texture analysis of an original image is performed, and segmentation is conducted on the current image. An enlarged region including the periphery of the pedestrian detection frame of the original image is segmented into four, and uniformity of images in four segmented regions is evaluated. If the images are determined to be uniform, they are considered to be a portion of the same segmentation. If the images are determined to be non-uniform, segmentation in four regions is repeated. Thus, an input image is segmented into a tree structure, and similarity of adjacent segmented images corresponding to a termination node of the tree structure is evaluated. If the images are determined to be similar, the adjacent regions are considered to belong to the same segmentation, and are combined together. This process is repeated until there are no regions to be combined.

As described above, segmentation is conducted on an original image basis, and an average of parallaxes for each segmentation is obtained. The region where a parallax greatly varies is originally discounted. A region containing objects which are relatively close to each other and have parallax values close to each other, such as a parked vehicle and a pedestrian, and segmented into different segmentation is referred to as a target. In this case, it is possible to improve the location accuracy of the pedestrian by calculating distance information by excluding the parallax information of the segmentation region which is considered to be other than the pedestrian in the pedestrian detection frame. Particularly, in this segmentation, for the same object such as an artificial material, segmentation is well performed for an object which is more likely to have the same texture. Therefore, the segmentation is utilized to exclude the parallax information in segmentation of an artificial material, such as a building or a vehicle, included in the pedestrian detection frame, rather than whether or not the segmentation for the pedestrian is in success.

The original image texture analysis unit 430 may be used only when it is found that the separation from the periphery is not achieved by the peripheral separation degree calculation unit 420. In addition, this segmentation provides the calculation indicating that the accuracy of the location information is low, as there are a lot of another segmentation included in the pedestrian detection frame.

Further, when it is found that the separation from the periphery is not achieved by the peripheral separation degree calculation unit 420, and an original image seems to be not segmented well into segmentation due to less texture, the location accuracy may be determined to be low because of low parallax density in the pedestrian frame, considering that the edge intensity inside is extremely low.

<Rushing Out Region Priority Unit 440>

This unit may be used only when it is found that the separation from the periphery is not achieved by the peripheral separation degree calculation unit 420. In the case in which an object is obviously the one separated from behind a 3D object, it is likely that a pedestrian detection frame is formed in which a part in the rushing out direction is a portion of the body of the pedestrian and a portion of the 3D object which is an object shielding the body of the pedestrian on the side opposite to the rushing out direction is included. In such case, the pedestrian condition is classified into three categories: a pedestrian moving to the right, a pedestrian moving to the left, and a pedestrian who is not moving, wherein the categorization may be performed with an error being caused. If it is found to be a pedestrian who is now moving and rushing out from behind a 3D object, a method for improving accuracy is considered by using only the parallax of the half side of the pedestrian in the direction of movement. This process is performed only when the separation between the pedestrian and the 3D object blocking the pedestrian is not in success even by the separation degree or the texture analysis. Although the 3D object which is a blocking object and the pedestrian are not actually separated from each other, the possibility of the decrease in the proportion of the blocking region is increased, and the possibility of improvement in the location accuracy is high. Thus, this process is executed.

<Accretion Analysis Unit 450>

It can be determined by the original image texture analysis that the location accuracy is reduced when there is a little parallax information in the detection frame. However, the case in which the location accuracy is reduced despite parallax information being present may actually occur.

Next, the accretion analysis unit 450 will be described with reference to FIGS. 15(a) to 15(c). The outline of the accretion analysis unit that detects accretion, such as mud, which blocks the background will be described with reference to FIGS. 15(a) to 15(c). It is a logic for detecting a region where there is mud which makes it difficult to recognize the background, the luminance is continuously lowered as compared to the periphery, and the luminance variation is small. The accretion analysis unit 450 divides the image region of the captured image into a plurality of blocks A (x, y) as illustrated in FIG. 9(b).

Next, the accretion analysis unit 450 detects the luminance of each pixel in the captured image. Then, the accretion analysis unit 450 calculates the luminance total $I_t(x, y)$ of respective pixels included in a block A(x, y) for each block A(x, y). The accretion analysis unit 450 calculates, for each block A(x, y), the difference $\Delta I(x, y)$ between $I_t(x, y)$ calculated for the captured image in the current frame and $I_{t-1}(x, y)$ similarly calculated for the captured image in the previous frame.

The accretion analysis unit 450 detects a block A(x, y) in which $\Delta I(x, y)$ is smaller than the peripheral blocks, and increments the score SA(x, y) corresponding to the block A(x, y) by a predetermined value, e.g., by 1.

After performing the above determination for all pixels in the captured image, the accretion analysis unit 450 acquires an elapsed time to from the initialization of the score SA(x, y) of each block A(x, y). Then, an accretion detection unit 240 calculates a time average SA(x, y)/tA of the score SA(x, y) by dividing the score SA(x, y) of each block A(x, y) by the elapsed time tA.

In the state in which accretion is deposited as described above, a false parallax is generated on the accretion and the background, or parallax information itself cannot be obtained, in some cases. Therefore, if the accretion region in the pedestrian detection frame is not less than a certain threshold, location accuracy information is lowered according to the proportion thereof.

<Light Source Analysis Unit 460>

Figure 16:
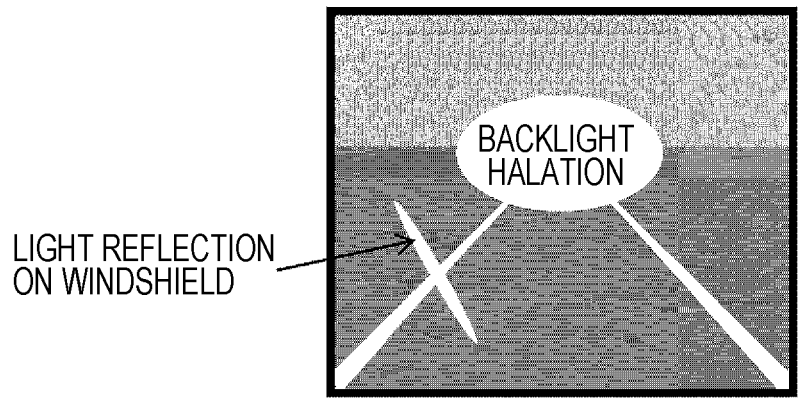
FIG. 16 is a diagram illustrating a method for analyzing a light source.

As illustrated in FIG. 16, there arises a problem such that, due to backlight or reflection, luminance becomes high on a screen, by which a region where background is invisible is generated. If light reflection or the like occurs, a false parallax may be generated. If backlight occurs, a parallax cannot be obtained from the periphery. Therefore, in a high-luminance region illustrated in FIG. 16, a possibility in which a right parallax is obtained is determined to be low, and thus, location accuracy information is lowered according to the proportion of the high-luminance region in the pedestrian detection frame.

<Accuracy Information Acquisition Unit 490>

Location accuracy information of an instantaneous value is acquired by using the density calculation result, the separation degree calculation result, the texture analysis result, whether the rushing out region priority is used or not, the accretion analysis result, and the light source analysis result. When the location correction is performed in the separation degree calculation, the accuracy information acquisition unit 490 acquires location accuracy information to which correction has been performed, not the initial location accuracy information.

Figure 18:
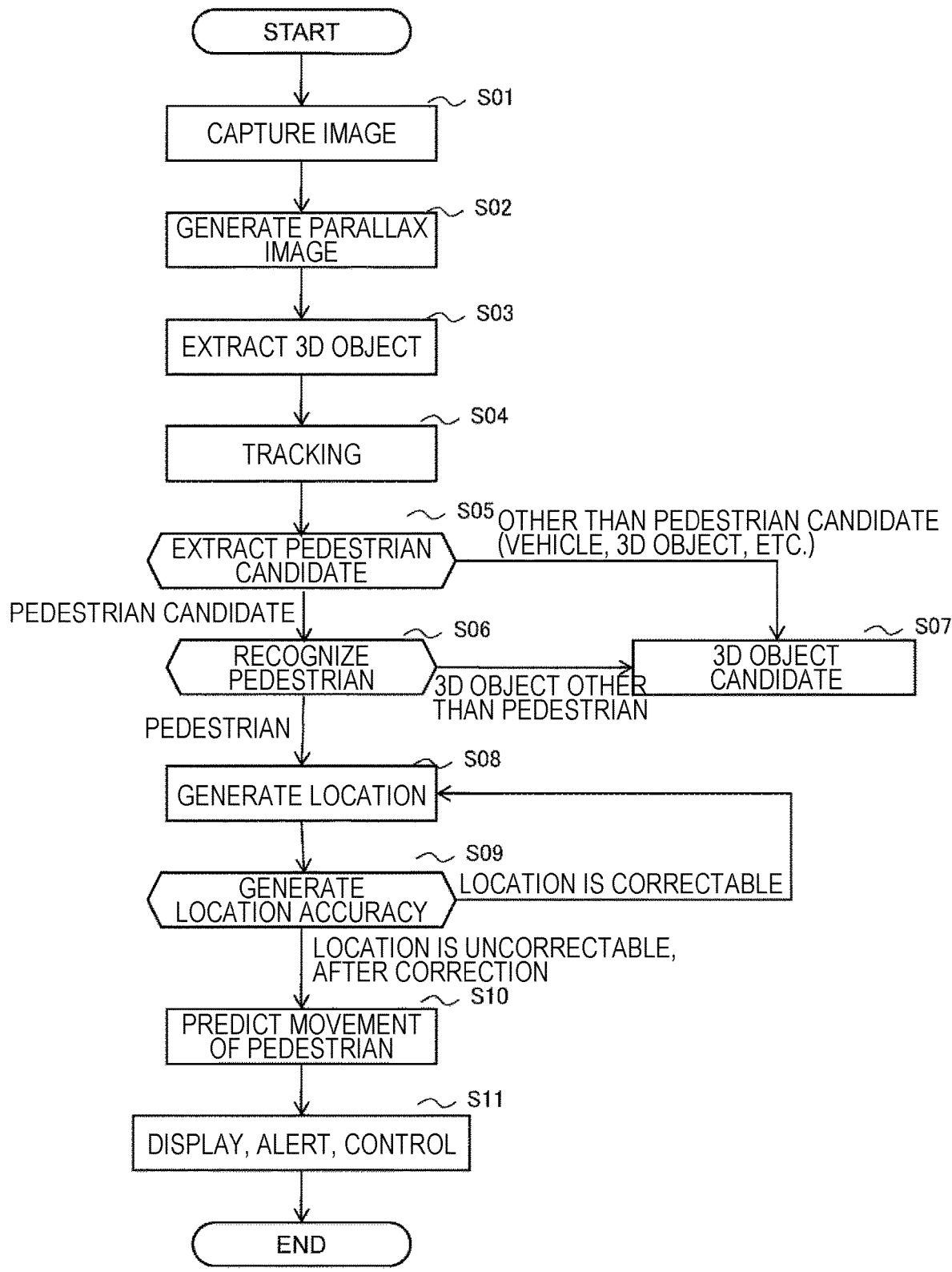
FIG. 18 is a flowchart of a process for preventing collision against a pedestrian.

Next, a process flow for preventing collision with a pedestrian will be described with reference to FIG. 18.

In step S01, the stereo camera imaging unit 100 captures an environment ahead of the vehicle.

In step S02, the parallax image generation unit 200 executes a stereo matching process using the image captured by the stereo camera imaging unit 100 to generate a parallax image.

In step S03, the 3D object extraction unit 310 extracts 3D object candidates from the parallax image of the current frame.

In step S04, the tracking unit 320 tracks the 3D object candidates independently extracted for each frame in step S03, by using the locations of the 3D object candidates in the current frame and at least two or more of the locations of the 3D object candidates in the previous frame, the speed information of the 3D objects, the vehicle behavior, and the like. By tracking the 3D object candidate in a time-series manner, a noise factor, such as an emergence of a 3D object candidate in only one frame, can be eliminated.

In step S05, 3D object candidates which are falsely extracted are eliminated by tracking, and a pedestrian candidate 3D object with a size which can be a pedestrian candidate is selected from them by the recognition unit 330 in a simplified manner. It is determined that an object which is too large or too small cannot be a pedestrian, and the process proceeds to step S07. For a 3D object which can be a pedestrian candidate, the process proceeds to step S06.

In step S06, pedestrian recognition is executed by the recognition unit 330 only for the pedestrian candidate 3D object which can be tracked. The pedestrian recognition is executed by using an edge image generated from the current image, parallax information, etc. The pedestrian candidate 3D object which has been recognized as being not a pedestrian is additionally registered as a 3D object candidate which is determined to be other than the pedestrian in step S07. For the pedestrian candidate 3D object which is recognized as a pedestrian by the recognizer, the process proceeds to step S08. Note that, in the present embodiment, detection of a vehicle or a sign other than a pedestrian candidate is not handled. Therefore, they are extracted as 3D object candidates other than a pedestrian, and the process afterward will be omitted.

In step S08, for the object which has been recognized as a pedestrian, the parallax value in the frame upon extraction of the 3D object candidate is observed to generate the pedestrian location by the location information calculation unit 510.

In step S09, after the generation of the location information, the location accuracy information generation unit 400 acquires the accuracy information of the pedestrian location or determines whether or not it is possible to improve the accuracy of the pedestrian location. If the location accuracy information generation unit 400 determines that it is possible to improve the accuracy, the process returns to step S08 where the location information is again generated by the accuracy-information-considered location information recalculation unit 520. The process proceeds to step S10 when the location accuracy information generation unit 400 determines that it is impossible to improve the accuracy, that is, determines that there is no need to improve the accuracy because the accuracy is relatively good, and when it is determined that the accuracy is not good but there is no method to improve the accuracy.

In step S10, the movement information prediction unit 530 predicts the destination of the pedestrian using the location information and the location accuracy information of the pedestrian.

In step S11, the collision between the pedestrian and the vehicle based on the prediction of the movement of the pedestrian and the prediction of the vehicle behavior. When they are likely to collide against each other, display, alert, and control are executed according to the location accuracy information and the pedestrian location.

As described above, the object detection device according to the present embodiment is conducive to carrying out control in an appropriate manner according to the surrounding environment, with consideration to the accuracy of locations of objects.

In addition, the object detection device extracts a 3D object from a distance image generated by using a stereo camera mounted on a vehicle, acquires the location information of the extracted 3D object, and analyzes in detail the accuracy information of the acquired location information and whether or not the location information can be corrected. When the location information can be corrected, the object detection device again acquires the location information and the location accuracy information, estimates the location and speed of the 3D object by using these results, and more appropriately determines the collision likelihood from the behavior of the vehicle, thereby being capable of reducing a delay in the control or the occurrence of false control.

Further, it is not easy to always accurately specify the location of an object. However, using only the accurate location as a detection result for performing the control according to the surrounding environment is not suitable for the recognition of the surrounding environment. In view of this, the object detection device according to the present embodiment uses location information in consideration of the detection state of the location of the detected object. The vehicle can appropriately be controlled according to the accuracy of the location information.

Note that the object detection device according to the present invention is not limited to the embodiment described above, and various modifications are possible without departing from the spirit thereof.

For example, while the above embodiment describes that an object to be detected is mainly a pedestrian, it is not limited thereto. An object to be detected may be a bicycle, a motorbike, a four-wheel vehicle, an animal, or other moving bodies. Besides, an object to be detected may be a columnar body such as an electric pole or a signal, or a fixed body on a ground such as a wall.

REFERENCE SIGNS LIST

100 . . . stereo camera imaging unit, 200 . . . parallax image generation unit, 300 . . . pedestrian detection unit, 310 . . . 3D object extraction unit, 320 . . . tracking unit, 330 . . . recognition unit, 400 . . . location accuracy information generation unit, 410 . . . density calculation unit, 420 . . . peripheral separation degree calculation unit, 430 . . . original texture analysis unit, 440 . . . rushing out region priority unit, 450 . . . accretion analysis unit, 460 . . . light source analysis unit, 490 . . . accuracy information acquisition unit, 500 . . . location information generation unit, 510 . . . location information calculation unit, 520 . . . accuracy-information-considered location information recalculation unit, 530 . . . movement information prediction unit, 600 . . . display/alert/control unit, 610 . . . TTC calculation unit, 620 . . . output determination unit, 630 . . . output unit, 631 . . . display unit, 632 . . . alert unit, 633 . . . control unit

The invention claimed is:

1. An object detection device comprising:
an object detector configured to
generate parallax information from a plurality of parallax images acquired from a plurality of cameras;
detect objects contained in the parallax images;
generate location information about the objects, on the basis of the parallax information; and
generate location accuracy information pertaining to the accuracy of the location information, on the basis of a characteristic of the parallax information,
generate the location information on the basis of an effective parallax, the effective parallax being a parallax pertaining to a part of the objects for which stereo matching has been successfully performed in an object region corresponding to the objects, and
generate the location accuracy information on the basis of a histogram obtained by projecting an amount of effective parallaxes contained in an enlarged region including the object region corresponding to the objects and an adjacent region adjacent to the object region on one axis along an area between the object region and the adjacent region.

2. The object detection device according to claim 1, wherein
the location accuracy information is generated on the basis of a proportion between an area of the object region containing the objects and an area of an effective parallax region which is included in the object region and from which effective parallaxes are obtained.

3. The object detection device according to claim 1, wherein
the location accuracy information is generated on the basis of characteristic point information of a corresponding region corresponding to the object region containing the objects in at least a single parallax image in the plurality of parallax images.

4. The object detection device according to claim 1, wherein,
the effective parallaxes are in the object region containing the objects and correspond to the distance of the objects, and the location information and the location accuracy information are generated on the basis of the effective parallaxes.

5. The object detection device according to claim 1, wherein
when the accuracy of the location information of the objects is low, and the direction of movement of the objects determined from a time-series location of the objects makes an approach to a course of the object detection device, the location information about the objects and the location accuracy information are generated on the basis of parallax information for a forward section in the direction of movement of the objects, out of effective parallaxes being parallaxes pertaining to a part of the objects to which stereo matching has been performed in an object region corresponding to the objects.

6. The object detection device according to claim 1, wherein
the object detector uses the cameras to detect a pedestrian, and when the pedestrian is imaged as overlapping other object in an optical axis direction of the cameras, the pedestrian and the other object are separated from each other, and the location information and the location accuracy information of the pedestrian are generated on the basis of the parallax information on a portion, of the pedestrian, separated from the other object.

7. The object detection device according to claim 1, wherein the object detector
is configured to generate the location accuracy information on the basis of a degree of overlap between an object region containing the objects and a halation region where halation occurs due to light.

8. The object detection device according to claim 1, wherein
the object detector is further configured to generate the location accuracy information on the basis of a degree of overlap between an object region containing the objects and an accretion region where accretion is deposited to block imaging regions of the cameras.

9. The object detection device according to claim 1, wherein
the object detection device is mounted on a vehicle, and is configured to change control level of the vehicle on the basis of the location information and the location accuracy information.

10. An object detection device comprising:
an object detector configured to:
generate parallax information from a plurality of parallax images acquired from a plurality of cameras;
detect objects contained in the parallax images;
generate location information about the objects, on the basis of the parallax information; and
generate location accuracy information pertaining to the accuracy of the location information, on the basis of a characteristic of the parallax information, wherein
the location information is generated on the basis of an effective parallax, the effective parallax being a parallax pertaining to a part of the objects to which stereo matching has been successfully performed in an object region corresponding to the objects, and the location accuracy information is generated on the basis of a proportion between an area of the object region containing the objects and an area of an effective parallax region which is included in the object region and from which effective parallaxes are obtained.

11. An object detection device comprising:
an object detector configured to:
generate parallax information from a plurality of parallax images acquired from a plurality of cameras;
detect objects contained in the parallax images;
generate location information about the objects, on the basis of the parallax information; and
generate location accuracy information pertaining to the accuracy of the location information, on the basis of a characteristic of the parallax information, wherein
when the accuracy of the location information of the objects is low, and the direction of movement of the objects determined from a time-series location of the objects makes an approach to a course of the object detection device, the location information about the objects and the location accuracy information are generated on the basis of parallax information for a forward section in the direction of movement of the objects, out of effective parallaxes being parallaxes pertaining to a part of the objects to which stereo matching has been performed in an object region corresponding to the objects.

12. An object detection device comprising:
an object detector configured to:
generate parallax information from a plurality of parallax images acquired from a plurality of cameras;
detect objects contained in the parallax images;
generate location information about the objects, on the basis of the parallax information; and
generate location accuracy information pertaining to the accuracy of the location information, on the basis of a characteristic of the parallax information, wherein
the location accuracy information is generated on the basis of a degree of overlap between an object region containing the objects and a halation region where halation occurs due to light.

13. An object detection device comprising:
an object detector configured to:
generate parallax information from a plurality of parallax images acquired from a plurality of cameras;
detect objects contained in the parallax images;
generate location information about the objects, on the basis of the parallax information; and
generate location accuracy information pertaining to the accuracy of the location information, on the basis of a characteristic of the parallax information, wherein
the location accuracy information is generated on the basis of a degree of overlap between an object region containing the objects and an accretion region where accretion is deposited to block imaging regions of the imaging units.

* * * * *